United States Patent Office 3,552,846
Patented Jan. 5, 1971

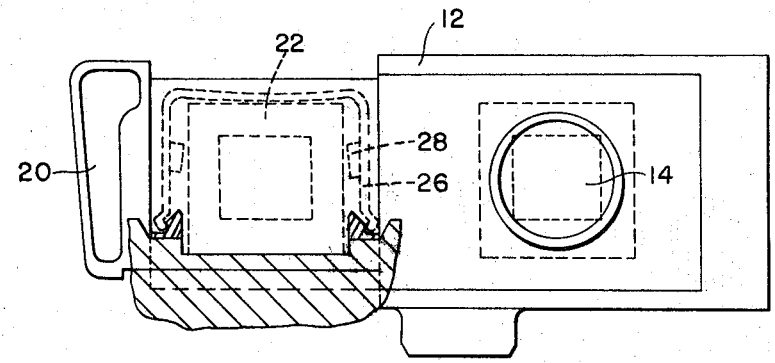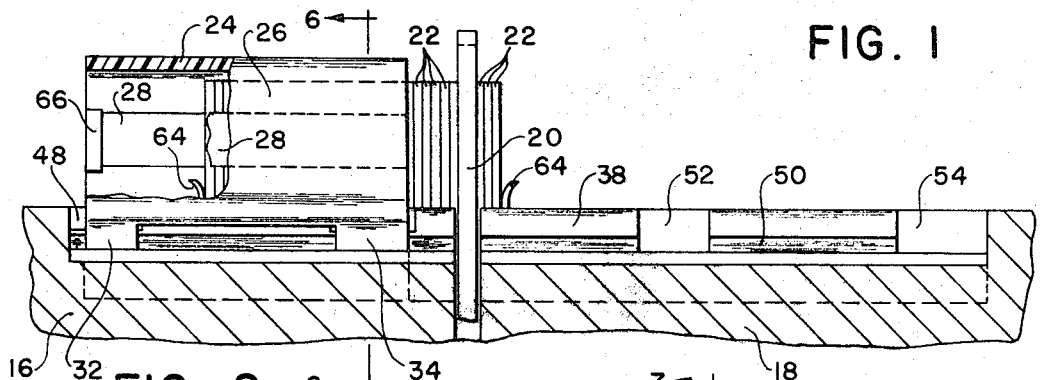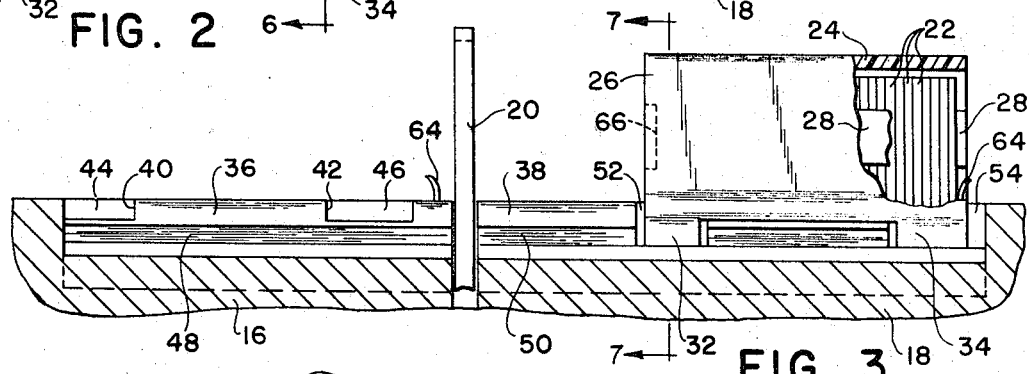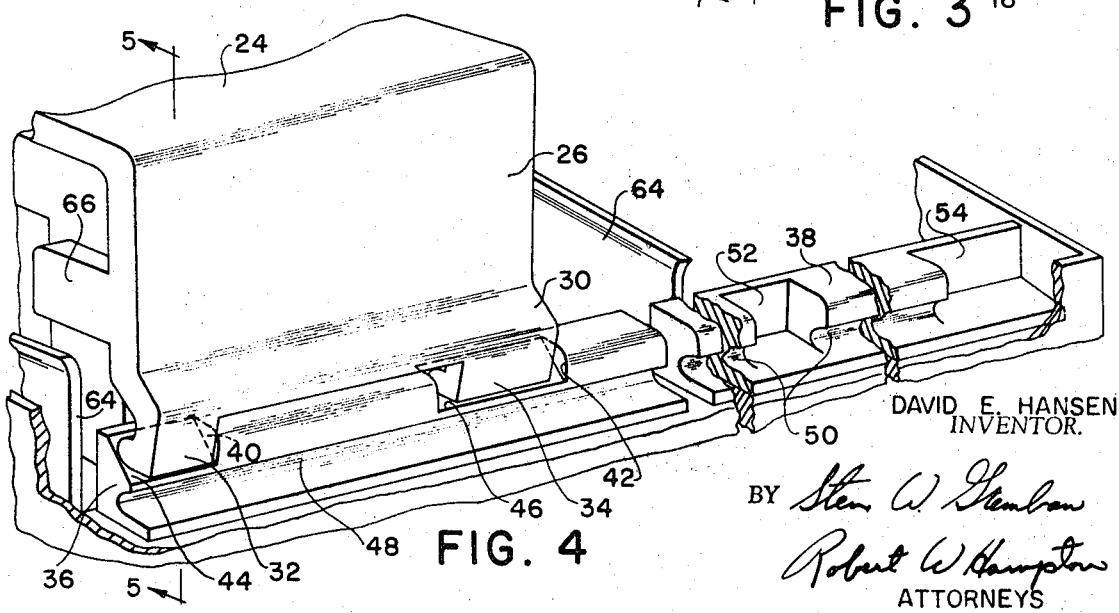

---

3,552,846
SLIDE STACK HANDLING SYSTEM FOR PROJECTORS
David E. Hansen, Rochester, N.Y., assignor to Eastman Kodak Company, Rochester, N.Y., a corporation of New Jersey
Filed May 1, 1968, Ser. No. 725,749
Int. Cl. G03b 23/00
U.S. Cl. 353—103                                    18 Claims

ABSTRACT OF THE DISCLOSURE

A slide stack handling system for slide projectors comprising a slide holder for releasably holding a stack of slides and cooperating with structure on the projector to release the slides when the slide holder is moved to a slide releasing position in the supply chamber of the projector. After all of the slides have been projected, the slide holder is movable to a slide gripping position in the slide take-up chamber for gripping the stack of slides and for removal of the slide holder from the projector. The removed slide holder serves as a cover for a receptacle to provide slide storage.

BACKGROUND OF THE INVENTION

This invention relates generally to projecting systems, and more specifically to an improved slide stack handling system for slide projectors or the like.

Slide projectors of the type having a projecting station, a slide supply chamber for receiving a stack of slides in side-by-side relation, a slide take-up chamber, and slide transport means for transporting the slides one at a time from the slide supply chamber to the projecting station, and then to the take-up chamber in stacked relation, are well known in the art. With such slide projectors, it is necessary for the operator to manually grasp slides individually or in a stack, and to insert them into the supply chamber of the projector, and then to manually remove the slides from the take-up chamber after they have been projected. One of the disadvantages of this procedure is that considerable manual handling of the slides, individually or in a stack, is involved subjecting the slides to a great deal of wear. This is particularly a problem where the slides comprise slide mounts made of a flexible cardboard or similar material. As is well known, cardboard slide mounts or the like are susceptible to bending, fraying, and other forms of mutilation when they are manually handled. This invention is believed to minimize this disadvantage by providing a novel slide stack handling system for minimizing the necessity for manually handling the slides, individually or as a stack.

SUMMARY OF THE INVENTION

This invention includes within its scope a slide stack handling system for slide projectors that eliminates the necessity for manually handling slides individually or as a stack once they have been loaded into slide holding means of the system. The slide holding means releasably holds a stack of slides, and cooperates with first control means on the projector when the slide holding means is moved into a slide releasing position in the supply chamber of the slide projector for releasing the slides. After all of the slides in the supply chamber have been individually projected and moved into the take-up chamber, the slide holding means is moved to a slide gripping position in the take-up chamber where it cooperates with second control means to grip the slides. The slide holding means and slides releasably held therein are removable from the projector while in the slide gripping position.

One of the objects of the present invention is to provide a slide stack handling system for slide projectors for minimizing the necessity of manually handling the slides, individually or as a stack, once they have been loaded into the slide stack handling system.

Another object of the invention is to provide a slide stack handling system in which slide holding means cooperates with the projector to release the slides in the supply chamber and to recover them from the take-up chamber after they have been projected, the slide holding means also serving as a file-box cover for storage of the slides.

Objects and advantages other than those set forth above will be apparent from the following description when read in connection with the accompanying drawings.

BRIEF DESCRIPTION OF THE DRAWINGS

In the drawings:

FIG. 1 is a segmental front elevation view partly in section of a slide projector incorporating the slide stack handling system of this invention, and further showing by dotted lines the slide holding means in its slide releasing position in the supply chamber of the projector;

FIG. 2 is a segmental side elevation view of the slide projector of FIG. 1;

FIG. 3 is a view similar to FIG. 2 showing the slide holding means in its slide gripping position in the take-up chamber of the projector;

FIG. 4 is an enlarged perspective view showing one of the guide rails of the projector, and a portion of the slide holding means resting thereon in the supply chamber of the projector;

DESCRIPTION OF THE PREFERRED EMBODIMENT

Figure 5:
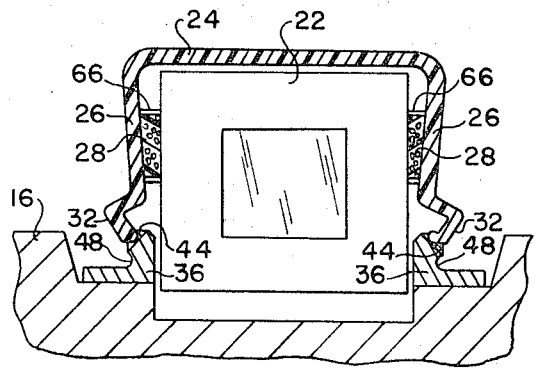
FIG. 5 is a segmental section view taken substantially along line 5—5 of FIG. 4.

Referring to the drawings, the slide track handling system of this invention is shown in connection with a slide projecter 12 of the general type having an optical system 14 and aligned slide supply and take-up chambers 16, 18 respectively laterally spaced from optical system 14. The slide projector 12 further has a reciprocally movable slide transport member 20 interposed between chambers 16, 18 for successively transporting slides 22 individually from supply chamber 16 to a projecting position in alignment with optical system 14 for projection of the slide image, and then returning the projected slide to slide take-up chamber 18.

The slide stack handling system of this invention essentially comprises slide holding means cooperable with first control means on projector 12 for releasing slides 22 in the supply chamber, and second control means on projector 12 to recover the slides from take-up chamber 18 after they have all been projected. The slide holding means comprises a substantially U-shaped slide holding member 24 having a top and a pair of substantially identical resilient depending sides 26. The inner surfaces of sides 26 are preferably provided with resilient pads 28 for engaging the opposite edges of a stack of slides 22 and releasably holding them when sides 26 are spread apart and the slides 22 manually inserted or interposed by other means between the sides. Each side 26 has a bent lower end portion 30 terminating in a pair of spaced projections or cam followers 32, 34 as best seen in FIG. 4.

Figure 6:
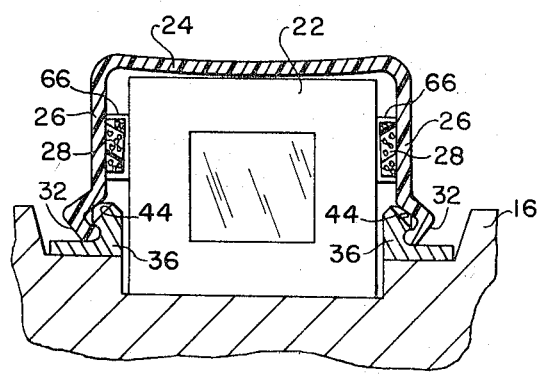
FIG. 6 is a segmental section view taken substantially along line 6—6 of FIG. 2, and showing the slide holding means in its slide releasing position.

The first and second control means for the slide stack handling system of this invention comprises a pair of spaced, parallel guide rails 36, 38 mounted in the supply and take-up chambers 16, 18 respectively in aligned relationship. Each of the guide rails 36 in supply chamber 16 has cut-out portions 40, 42 forming a pair of spaced cam ramps 44, 46 corresponding to the pair of cam followers 32, 34 as best seen in FIG. 4, and an elongated groove 48 below ramps 44, 46 and extending along the full length of guide rails 36. One pair of the oppositely disposed cam ramps 46 and corresponding cam followers 34 are longer than the other pair of corresponding ramps 44 and followers 32 to permit mounting slide holding member 24 on the guide rails 36 in only one possible and correct orientation. When slide holding member 24 is initially manually placed on guide rails 36 in a correct orientation as seen in FIGS. 4 and 5, and then depressed into its slide releasing position as seen in FIGS. 2 and 6, cam ramps 44, 46 initially spread sides 26 apart causing pads 28 to release slides 22; the ends of ramps 44, 46 then bottoming in groove 48 with pads 28 still held out of engagement with slides 22. Although slide holder 24 is shown as having two pairs of oppositely disposed projections 32, 34 of varying length, it should be understood that a lessor or greater number of projections may be provided. For example, holder 24 could be provided with only a single projection on each side thereof.

Figure 7:
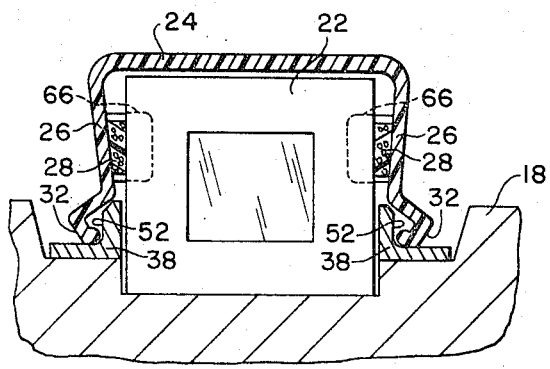
FIG. 7 is a segmental section view taken substantially along line 7—7 of FIG. 3, and showing the slide holding means in its slide gripping position.

The guide rails 38 in take-up chamber 18 are provided with grooves 50 in register with grooves 48 in guide rails 36. Each guide rail 36 has a pair of spaced notches 52, 54 corresponding to and in register with the pair of cam followers 32, 34 when the slide holding member 24 is in its slide gripping position as seen in FIG. 3. The notches 52, 54 interrupt groove 50 as best seen in FIG. 4, and are recessed a sufficient distance such that when slide holder 24 is slid along grooves 48, 50 from its slide releasing position in supply chamber 16 to its slide gripping position in take-up chamber 18, the sides 24 and projections or followers 32, 34 move toward one another causing pads 28 to engage the opposite sides of the stack of slides 22. In this position, the slides 22 hold the ends of cam followers 32, 34 out of engagement with the sides of notches 52, 54 respectively as seen in FIG. 7 and in position for removal from projector 12 without any interference between cam followers 32, 34 and guide rails 38.

The slide holding member 24 further cooperates with a cup-shaped storage receptacle 56 (see FIGS. 9 and 10) to provide a storage container for the stack of slides 22. The receptacle 56 has integral end walls 58 between which slide holding member 24 is inserted with the ends of member 24 in substantially sliding engagement with the inner surfaces of end walls 58. The receptacle 56 has a channel 60 into which the ends of the stack of slides 22 extend, and further has shelves 62 engageable by cam followers 32, 34 for supporting the slide holding member.

Figure 8:
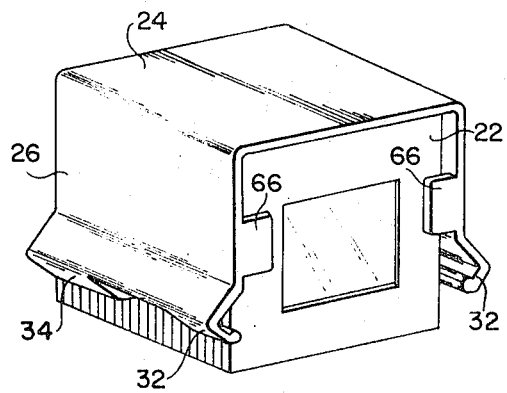
FIG. 8 is a rear perspective view of the slide holding means of this invention.
Figure 9:
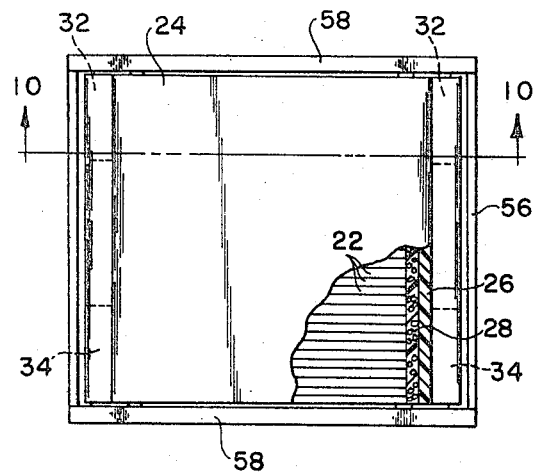
FIG. 9 is a top plan view of a slide storage container in which the slide holding means of this invention forms the cover.
Figure 10:
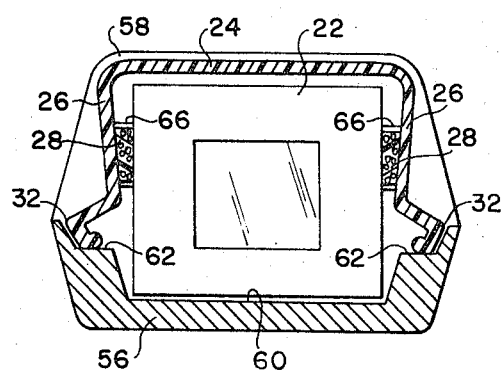
FIG. 10 is a section view taken substantially along line 10—10 of FIG. 9.

In the operation of this invention, the operator initially places a slide holding member 24 having a stack of slides 22 gripped therein on guide rails 36 in supply chamber 16 of projector 12 in its proper orientation with cam followers 32, 34 resting on their corresponding cam ramps 44, 46. The operator then manually depresses slide holding member 24, initially causing cam followers 32, 32 to ride along corresponding cam ramps 44, 46 forcing sides 26 apart to release slides 22 held therein. Such downward movement is continued until the ends of cam followers 32, 34 bottom in grooves 48, positioning slide holding member 24 in its slide releasing position, as seen in FIGS. 3 and 6. A spring biased pusher member 64 urges the released slides 22 into engagement with slide transport member 20 which, upon reciprocation, transports the leading slide into the slide viewing position for projection, and then returns it to take-up chamber 18 in a manner well known in the art. After all of the slides 22 have been projected, and slide transport member 20 retracted, the operator slides slide holding member 24 along guide rails 36, 38 from its slide releasing position into its slide gripping position as seen in FIGS. 3 and 7. During such movement, lugs 66 (see FIG. 8) of slide holding member 24 engage the last returned slide 22 in take-up chamber 18, and urge the entire stack of slides 22 therealong. In the slide gripping position of slide holding member 24, the cam followers 32, 34 thereof align with corresponding notches 52, 54 as best seen in FIGS. 3 and 4, permitting sides 26 of holding member 24 to move inwardly by virtue of their resilience, causing pads 28 thereof to grip the opposite edges of the stack of slides 22. The operator may then freely remove slide holding member 24 from guide rails 38 by manually lifting it therefrom and place it into storage receptacle 56, as seen in FIGS. 9 and 10.

The invention has been described in detail with particular reference to one embodiment thereof, but it will be understood that variations and modifications can be effected within the spirit and scope of the invention as described hereinabove, and as defined in the appended claims.

I claim:

1. As an article of manufacture, a slide holder comprising:
    a substantially U-shaped member having spaced sides;
    at least one of said sides being resilient and cooperable with the other side for gripping slides inserted therebetween; and
    each of said sides further having at least one projection at its free end in which said projection on one of said sides has a different configuration than said projection on the other side.

2. The invention according to claim 1 wherein said projections are of different lengths.

3. The invention according to claim 1 wherein said projections are of different lengths, and said slide engaging sides have resilient material secured to the inner surfaces of said sides for gripping said slides.

4. The invention according to claim 1 wherein said projections are curved and of different lengths, said slide engaging sides have resilient material secured to the inner surfaces of said sides, and one end of said member has an inwardly extending stop lug for slides.

5. In a slide handling system for releasing slides at a slide releasing station, and for gripping the slides at a slide gripping station, an operating station interposed between said slide releasing and slide gripping stations, and means for moving each slide in succession from said slide releasing station to said operating station where it is subjected to an operation, and then moved to said slide gripping station, the combination comprising:
    a slide holder;
    a first control means for slidably supporting said slide holder at said slide releasing station and cooperable with said slide holder for releasing the slides; and
    second control means for slidably supporting said slide holder at said slide gripping station and cooperable with said slide holder for gripping the slides after they have been moved thereto.

6. The invention according to claim 5 wherein said slide holder comprises a member having spaced sides between which slides are inserted with at least one of said sides being resilient.

7. The invention according to claim 5 wherein said slide holder comprises a substantially U-shaped member having spaced sides between which slides are inserted with at least one of said sides being resilient, and said first and second control means each comprise first and second spaced guide rails respectively for receiving and controlling said sides of said slide holder.

8. The invention according to claim 7 wherein at least one of said first guide rails of said first control means has a cam cooperating with said slide holder in said slide releasing position to spread said sides for releasing said slides, and at least one of said second guide rails of said second control means has a relieved portion cooperating with said slide holder in said slide gripping position to allow said sides to move toward one another to grip the slides therebetween.

9. The invention according to claim 8 wherein said cam is a ramp, and said relieved portion is a notch.

10. The invention according to claim 8 wherein said first and second guide rails of said first and second control means respectively have aligned grooves extending substantially along the full length thereof, and said slide holder is slidably movable along said grooves from said slide releasing station to said slide gripping station.

11. In a slide handling system for a slide projector having slide supply and take-up chambers, the combination comprising:
   slide holding means movable between said slide supply and slide take-up chambers;
   first control means on said projector for slidably supporting said slide holding means and cooperable with said slide holding means at said slide supply chamber for moving said slide holding means to a slide releasing position to release the slides in said slide supply chamber;
   means interposed between said slide supply and take-up chambers for transporting the released slides in succession from said supply chamber to a projection position for projection and then to said take-up chamber; and
   second control means on said projector for slidably supporting said slide holding means and cooperable with said slide holding means at said slide take-up chamber to permit movement of said slide holding means to a slide gripping position to grip the slides in the take-up chamber for removal from the projector after they have all been returned to said slide take-up chamber.

12. The invention according to claim 11 wherein said first control means comprises first spaced guide rails in said supply chamber, and said second control means comprises second spaced guide rails in said take-up chamber.

13. The invention according to claim 12 wherein said first spaced guide rails have at least one cam surface, and said second spaced guide rails have at least one relieving surface.

14. The invention according to claim 11 wherein said slide holding means comprises a member having spaced sides with at least one of said sides being resilient, said first control means comprises cam means in said supply chamber cooperable with said member to spread said sides to release the slides, and said second control means comprises relieving means in said take-up chamber cooperable with said member to allow said sides to move toward one another to grip the slides therebetween.

15. The invention according to claim 11 wherein said slide holding means comprises a member having spaced sides with at least one of said sides being resilient, and at least one of said sides having a projection, said first control means comprises spaced first guide rails in said supply chamber with at least one of said first guide rails having cam means cooperable with said projection in said slide releasing position to spread said sides to release the slides, and said second control means comprises spaced second guide rails in said take-up chamber with at least one of said second guide rails having relieving means cooperable with said projection in said slide gripping position to allow said sides to move toward one another to grip the slides therebetween.

16. The invention according to claim 15 wherein said spaced first and second guide rails are in alignment and corresponding ones of said first and second guide rails have a groove extending substantially along the full length of said first and second guide rails, and said member is slidably movable along said groove from its slide releasing position to its slide gripping position.

17. The invention according to claim 15 wherein said cam means comprises a ramp terminating in said groove, and said relieving means comprises a notch interrupting said groove.

18. The invention according to claim 15 wherein said slide holding member has two projections of different configuration, and said cam means comprises corresponding ramps for said projections.

References Cited
UNITED STATES PATENTS

| | | | |
|---|---|---|---|
| 2,533,441 | 12/1950 | Estes | 353—113 |
| 2,942,365 | 6/1960 | Badalich | 353—116 |
| 3,146,666 | 9/1964 | Misuraca | 353—104 |
| 3,209,647 | 10/1965 | Hall | 353—117 |

SAMUEL S. MATTHEWS, Primary Examiner